Oct. 28, 1924.  
J. F. OLDFIELD  
1,513,266  
FLEXIBLE CHAIN MAT FOR PNEUMATIC AND OTHER TIRES  
Filed Dec. 8, 1919  
4 Sheets-Sheet 1

Inventor  
John F. Oldfield.  
By Wayne H. Gordon  
Attorney

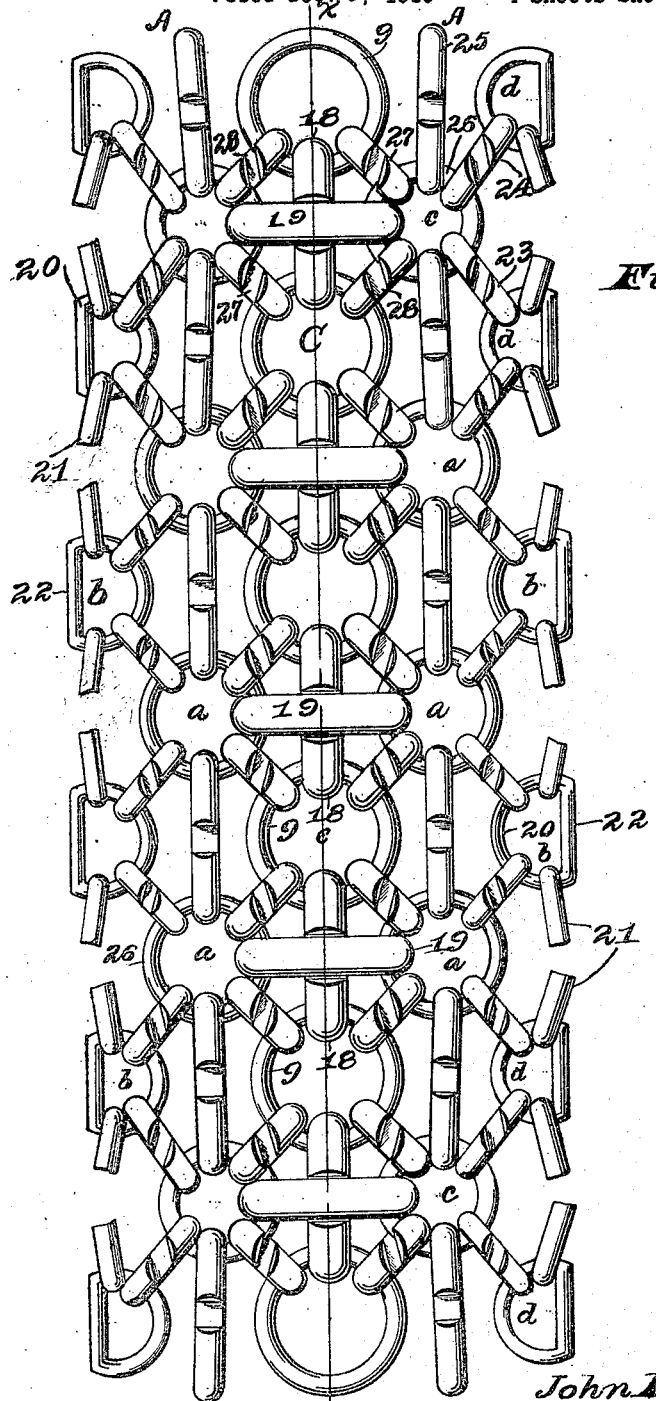

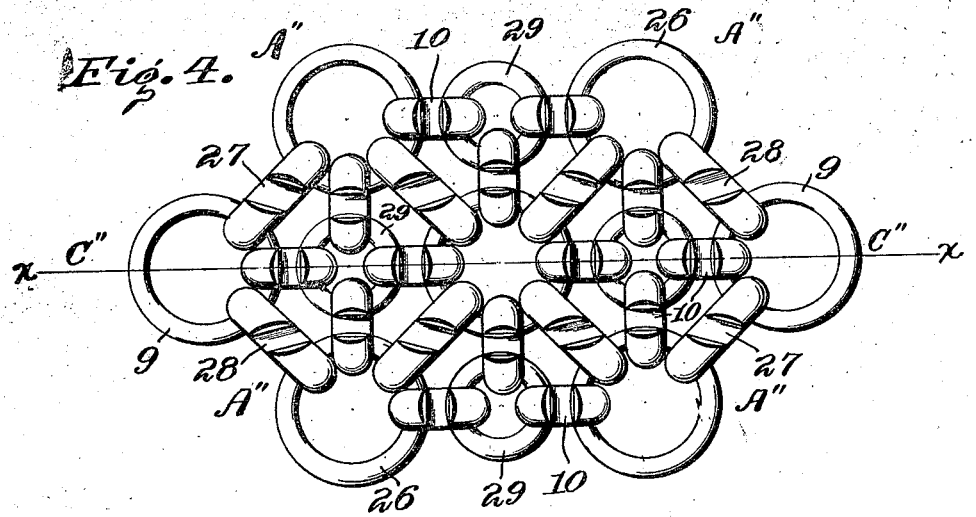
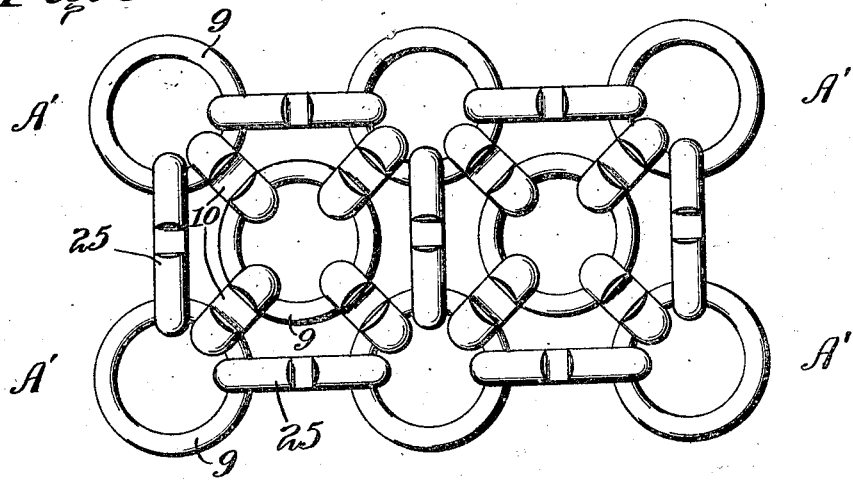

Oct. 28, 1924.  
J. F. OLDFIELD  
1,513,266  
FLEXIBLE CHAIN MAT FOR PNEUMATIC AND OTHER TIRES  
Filed Dec. 8, 1919    4 Sheets-Sheet 4
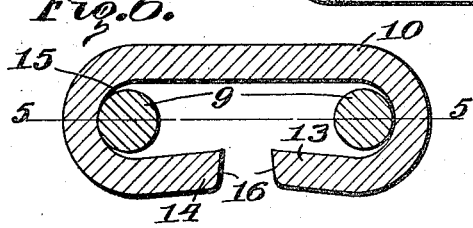 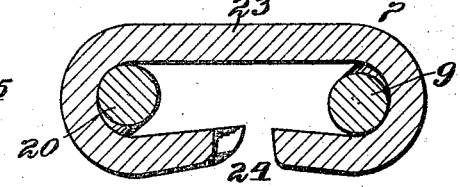
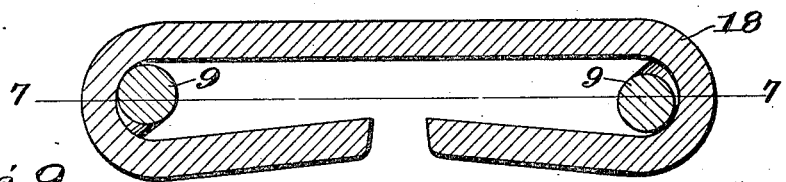
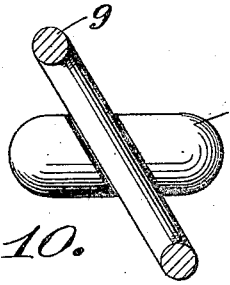 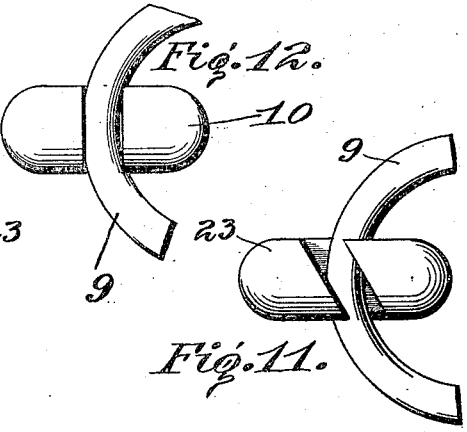
Inventor  
John F. Oldfield.  
By Haynes H. Gordon  
Attorney Patented Oct. 28, 1924.

1,513,266

UNITED STATES PATENT OFFICE.

JOHN F. OLDFIELD, OF BEL AIR, MARYLAND.

FLEXIBLE CHAIN MAT FOR PNEUMATIC AND OTHER TIRES.

Application filed December 8, 1919. Serial No. 343,151.

*To all whom it may concern:*

Be it known that I, JOHN F. OLDFIELD, a citizen of the United States, residing at Bel Air, in the county of Harford and State of Maryland, have invented new and useful Improvement in Flexible Chain Mats for Pneumatic and Other Tires, of which the following is a full and complete specification.

My invention deals with armored coverings for pneumatic and other tires and comprises an assemblage of elements providing a tightly fitting cover surrounding the pneumatic or other tire. It is a primary object of my invention to shield the surface of pneumatic and other tires from wear caused by frictional contact with the roadway. By the use of my improved device with pneumatic tires, it is possible to consider the pneumatic tire as merely a cushioning container for air without its being required to resist friction from the surface of the road. This prolongs the life of the tire and makes for greater economy. In addition to forming a wearing surface for the tire my cover has the added advantage of increasing the frictional coefficient and promoting traction with the road. The elements used in the assemblage of the tire covering are rings of various sizes, and split links of varying lengths. The links are in some cases given a specific improved form to prevent their disengagement while in use. All of the links are given an improved form whereby greater adhesion to the tire is attained.

It is an object of my invention to form a flexible pressure-resisting covering for pneumatic tires and to prevent blow-outs from occuring in the latter.

It is a further object to construct a flexible wear-resisting covering which will preserve the rubber or other tire material from unnecessary frictional depreciation.

A further object of my invention is to produce a flexible tread that can be inverted and worn out from both sides. After one surface has been considerably worn down by contact with the road, the armor may be reversed to obtain further wear by contact of the other surface with the road.

It is a further object of my invention to insure a means for preventing the wheel from slippage over the road, either in the direction of tread or inclined thereto.

An additional object of my invention resides in a construction requiring a minimum of different parts. This renders assembly and repairs simple and quick.

A further object of my invention is in the particular form of parts rendering accidental release impossible.

It is proposed by this invention to construct the elements of the cover with a view to maintaining their contact with the tire and the road uniform regardless of the degree of wear sustained.

Further advantages arising in the use of my invention reside in marked economy of manufacture, simplicity of assemblage and repair.

My invention includes such other improvements as will be apparent from the following description and drawings, in which—

Fig. 2 is a plan view of a modification.

Fig. 3 is a detail of a further modification.

Fig. 4 is a detail of a modified assemblage.

Fig. 5 is a section of a link taken on the line 5—5 in Fig. 6.

Fig. 6 is a sectional elevation of a short split link.

Fig. 7 is a sectional elevation of another form of short split link.

Fig. 8 is a section of a link taken on the line 7—7 of Fig. 9.

Fig. 9 is a longitudinal section of a long wall link.

Fig. 10 is a view of a link similar to that shown in Fig. 7 and illustrating the manner of inserting and removing the cooperating ring.

Fig. 11 is a view of a link and cooperating ring; and

Fig. 12 is a similar view of a modified form.

Figure 1:
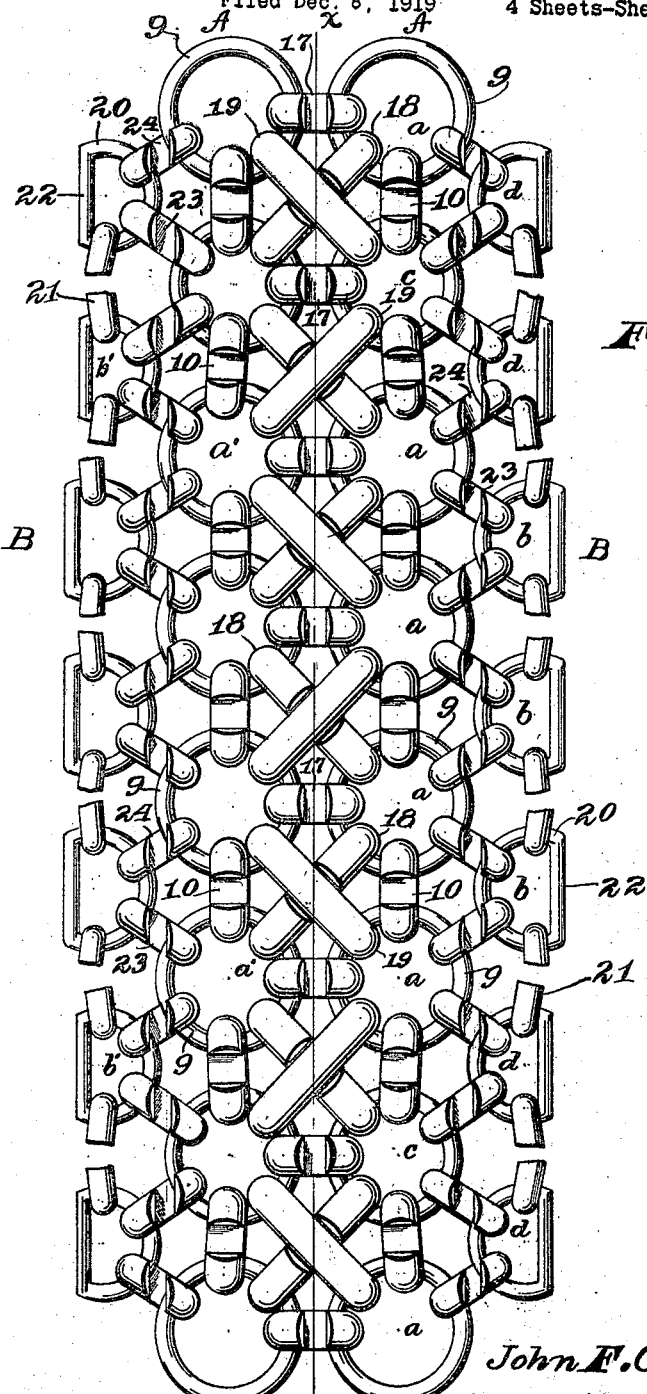
Fig. 1 is a plan view of my device.

For the purpose of illustration in the drawings the armored flexible cover has been shown as developed in a single plane although it will be evident from the following description that the relation of parts is such as to bring the covering in tightly fitting contact with the curved surfaces of the tire.

The flexible covering is formed by the assemblage of a plurality of longitudinal chains A, A, Fig. 1. These chains are arranged in two peripheral lines symmetrical to the longitudinal axis of the tread *x—x*. Each chain is made of alternate spaced rings 9 and links 10 of convenient sizes.

The links 10 are formed, as is shown in Figs. 5 and 6, from metal of a semi-circular, cross-sectional area having the inner surface flat as at 11 and the outer surface 12, curved. The links are proportioned so that their inner diameter at 15 is considerably greater than the diameter of the metal in the rings upon which they are mounted.

Tracing the chains running diagonally of the longitudinal direction of the tread and formed by alternate rings and links it will be apparent that the contour of the tire will throw these chains out of the plane in which they have been illustrated and that the chains may be said to run spirally of the tire. It follows that the rings will rest in planes perpendicular to the adjacent tire surface and each successive ring in the chain will be out of the plane of the preceding ring. As each ring tends to hold its attached links perpendicular to the plane of the ring and as the links between successive rings are subject to the influence of both rings, the links assume positions perpendicular to the surface of the tire at points midway between the centers of the successive rings. This may be described as the result of the twisting effect of two rings on the intervening link. As the rings conform in their planes to the tangents of the tire surface it follows that the links are held in proper position to maintain contact with the surface of the road without twisting or distorting from the plane perpendicular to the tire surface at the point of contact.

Each link 10 has an opening 16 in one side transverse to its longitudinal axis. This opening is proportioned to the width of the adjacent ring in the following manner. The ends 13 and 14 of the link approach too closely to permit the insertion or removal of a ring after the ring is moved in planes parallel to the longitudinal axis of the link. However, if one portion of the ring is brought between the longitudinal axis of the link the portion of the ring between the ends will just pass between the ends 13 and 14 and into the space of the link. The ring may then be brought with its plane coincident with the longitudinal axis of the link. In the latter position and in all positions except where the plane of the ring is perpendicular to the longitudinal axis of the link, the removal of the ring from the link is impossible.

Where applied to the longitudinal chains A, the links 10 have similar transverse openings, but the amount of play of the chains A and the close approach of the ends 13 and 14 prevents the accidental removal of the rings 9.

The spaced rings 9 in one chain are in symmetrical arrangement with the corresponding rings in the other chain and are connected to the latter by means of short split links 17, constructed similarly to the links 10 and having similar proportions.

Connecting the rings 9 of one chain to the rings of the other chain, and extending in a diagonal direction are the interlocking split links 18 and 19. Each of these links is relatively long and has a transverse opening in the middle of one side. The ends of the link incline inward toward the opposite side of the link as they approach the centre. The opening in the link is sufficient to permit the insertion and removal of the ring 9 in the manner above indicated with respect to links 10. The latter ring 9, substantially occupies by its thickness the space between the end of the link and the opposite side wall of the link, but when the ring has seated itself in the bight 15 of the link there would be considerable freedom of movement providing the adjacent rings 9 are in the same plane. As the adjacent rings 9 are distorted out of the same plane when in position upon the tire it follows that the intervening links are rigidly held in an intermediate position in the manner above described. The link is therefore held against rotational distortion around its longitudinal axis. As assembled the free ends of the link 18 embrace the middle of the opposite wall of the link 19 and vice versa. In this manner the space in the diagonal direction between rings 9 of the two chains is substantially filled, on both the side toward the road and the side toward the tire.

The assembly of the links upon the rings as above described constitutes one unit of the covering and may be defined as a group of four (4) rings whose planes are tangential to the surfaces of the tire, connected along their lines of adjacent centres by short split links and along the diagonal lines of centres by long split links. This relation of rings, short links and long diagonal links occurs throughout the length of the chains and forms the tread for the armor.

The ends of the longitudinal chains A, A are brought together around the tire and fastened by suitable members. In some instances these members may have locking devices although it is also possible to use the links 10 for this purpose. In order to insure a tight fit rings of slightly smaller diameter may be substituted at regular, equal and opposite intervals in the chains.

Side chains B are located on the outward sides of the chains A. These side chains are constituted of alternate rings 20 and split links 21. Each link is split in the middle of one side to provide a transverse opening, large enough for the insertion of the ring 20. Each ring 20 is flattened on one side segmentally as at 22.

The opposite portion of the ring is connected by two links 23 and 24 to adjacent rings 9. These short links 23 and 24 are thus diagonally disposed with respect to the chain and are split to provide openings, shown at 24′, Fig. 7, diagonally of their axes. As links 23 incline in one direction the opening in one side is given an inclination to the right of the longitudinal axis of the link substantially 60°. It may thus be termed a "right" link. Similarly, the link 24 being inclined in an opposite direction has the opening inclined to the left, and may be termed a "left" link. This brings the openings in the sides of the links substantially parallel to the line of tread.

Inclining the openings 24′ in the direction of the line of tread serves to prevent cutting or chafing of the tire in case the split side is in contact with the tire wall. The relative movement of the rings in the links is likewise under control and disengagement is prevented. For example in case the slackness of the cover permits the ring to slide toward the centre of the link the ring cannot ordinarily pass out between the free ends of the link as one free end maintains contact and holds the ring in until the other free end engages the ring. To remove the ring from the link requires the lateral movement of the ring, that is a portion of the ring may be brought parallel and beneath the inclined opening. The ends of the link which provide the inclined opening are spaced apart only a distance sufficient to permit the insertion and removal of the ring only after the ring is turned into the plane of the opening. At all other positions one or the other end of the link prevents the removal of the ring as above described with respect to the corresponding links 10. The length of diagonal slot is 40 per cent in excess of the transverse slot.

The straight portions 22 of rings 20 may be given sufficient size to permit the connection of the chains and to bring the outer rings closely in to the side walls of the tire and thus to conform to the adjacent rim of the wheel. The split links 21 allow assembly but in normal operation are tight enough to exert a pull in the direction of the axes of the links 19 and 23, or 18 and 24 as the case may be.

By reference to Figure 1 it will be noted that in the development of the covering in a single plane the lines of centers diagonally of the rings 9 take the direction $a-a'$. The corresponding line of centers between the links 9 of chain A and the adjacent links 20 of chain B is in the direction $a'-b'$. The line $b, a, a', b'$ is not straight. When, however, the covering is mounted upon the tire and rests in contact with the tire surface the line $b, a, a', b'$, will lie in a plane more oblique or spiral to the plane of the tread. Any tendency on the part of the links to draw a ring 9 out of its normal position will therefore be resisted on one side by a pull from a diagonally disposed ring 9 of the opposite chain A and on its other side by the adjacent ring 20.

The rings 9 and 20 may take any convenient diameter and weight. The links 10, 17, 18 and 19 are generally of the same material and thickness as they form parts of a common tractive surface. The links 21, 23 and 24 may be of considerably less weight and smaller proportons as they are not subjected to excessive wear and strain.

Due to the periodic variation in size of the rings 9, the line of centers, indicated by $a, c, a,-a, c, a,$ is not straight and the chains A—A are therefore out of parallel. A corresponding variation in the rings 20 throws the chains A, B out of parallel as is evident from the line of centers $d, d, b,-b, d, d$.

It is sometimes advisable to provide a chain consisting of alternate rings and split links along the axis of the tread $x-x$. Such a chain C forms the centre of the armored covering illustrated in Fig. 2. A central chain consists of alternate spaced rings 9 and split links 18. The latter links are disposed coincident with the axis $x-x$.

On each side of the central chain is placed a longitudinal symmetrical chain A consisting of links 25 and rings 26. The links 25 are disposed opposite the rings 9 while the rings 26 are placed opposite the links 18 of the central chain C. Short links 27 and 28 connect the rings of chain C with the adjacent rings of the chains A and are consequently disposed diagonally to the line of tread. The links 27 are split along the middle of one side and in a diagonal direction forming "rights." The openings in the links 28 are oppositely inclined and thus form "lefts." Passing transversely of the line of tread and connecting the rings 26 of one side chain to the corresponding rings 26 in the opposite chain are the split links 19 in the manner above described.

What may be termed a unit of tractive surface is thus provided by two rings 9 of the central chain and a ring 26 of each side chain. These support the diagonal links 18 and 19 and the short links 27 and 28. By reason of the fact that the rings in their separate planes, tangential to the several portions of the curved tire surface, twist the links laterally and thus hold them firmly, the latter are maintained at right angles to the plane of the periphery of the tire and thus form an unyielding wearing surface.

Outwardly of the chains A are attached side chains B composed of flattened rings 20 and connecting links 21. These side chains are adapted to fit snugly against the side walls of the tires and to be connected with the chains A by the diagonal links 23 and 24. The links 23 and 24 are made in two kinds, "rights" and "lefts" in order that the openings shall be in substantial parallelism to the line of tread at this point.

The lines of centers connecting chain C to the rings in chain A in the development of the covering in a single plane are represented by c—a in Fig. 2. The line connecting the centers of rings of the chains A and B is represented by a—b. The line of centers diagonal of the tire b, a, c, a, b is not straight. When, however, the covering is in position contacting with the surface of the tire this line, representing the direction of resistance to pull or displacement on any unit of tractive surface, is in a plane more obliquely diagonal to the tire. This arrangement serves to distribute any local pull to the side chains and intervening members and serves to strengthen the covering as a whole. By reason of the obliquely diagonal chains thus running from side to side of the covering, pull exerted at any point is distributed to the adjacent rings and to the outer chains.

As described for the chain shown in Fig. 1, a similar lack of parallelism is evident in the chains A, B and C where the lines of centers c, a,—a, c and d, b, b, d alternately approach and recede.

The sizes of the rings 9 in chain C may be the same although to insure close fit with the surface of the tire smaller rings may be substituted at regular intervals. A similar arrangement and substitution of rings may occur at opposite intervals in chains A and B, at alternating points of chain B thus maintaining symmetry with respect to the line of tread. This will also serve to bring the lines b, a, c, a, b into coincidence. The material of which the links 18, 19, 27 and 28 is composed, is generally the same and heavy enough to withstand considerable wear. The links 25, 24 and 21 are successively smaller in diameter.

In the manufacture of all the links, it is preferable that the free ends be bent inward a slight distance, as shown in Figs. 6, 7 and 9. If the open side of the split link is placed next to the tire it conforms very closely to the curvature of the latter and is not subject to movement. If the covering has been subjected to considerable wear, the closed side of the link, while considerably weakened, is subject to only a small bending effect and still retains a good wearing surface against the road, being held up by support from the free ends. If then the armor is inverted bringing the worn side toward the tire surface the side will conform very closely to the surface and may even bend into position of extensive contact therewith. The opposite side of the link now being on the outer side of the armor constitutes a new wearing surface on the road. The action of the inner side of the link in its slight bending movement conforming to the surface of the tire serves very noticeably to advance the opposite or frictional side of the link into position for effective tractive contact with the road. By applying the side having the inwardly bent ends first toward the tire, the extensive contact with the latter is attained from the beginning of the use of the armor and is not dependent upon the change in shape of the link.

In Fig. 3 there is shown a modification of a covering made from the two longitudinal symmetrical chains A', A' having flexible intermediate elements. The chains A', A' consist in the rings 9 connected by intervening links 25. The latter links 25 maintain a considerable space between the successive rings 9. Similar transverse links 25 connect the opposite adjacent rings 9 of the two longitudinal chains. There is thus formed a hollow square consisting of four rings 9 and opposite links 25 and 25. The interior of this square is occupied by a ring 9, connected to each of the rings 9 by a link 10.

By this structure there is avoided the necessity of using long and rigid members 18 and 19, and the advantage is gained of using a fewer variety of elements. It is necessary to use but two sizes of links.

Fig. 4 shows a modification wherein the chain C" occupies the line of tread. This chain is made of alternate spaced large rings 9 and small rings 29. Connecting adjacent rings are the short longitudinal split links 10 having transverse openings. The side chains A" are correspondingly constructed of large rings 26 and small rings 29 connected by the short split links 10. The rings 26 are slightly smaller than the rings 9 due to the fact that there are an equal number of elements in the two chains $A^2$ and $C^2$ but that the peripheral distance covered by the chain $A^2$ is less than the distance covered by the chain $C^2$. The rings 29 in chain A" are opposite the large rings 9 of chain C" while the slightly reduced rings 26 of chain A" are placed opposite small rings 29 in chain C". The large rings of one chain are connected to the adjacent small rings of the other chain by means of the transverse links 10. Diagonal long split links 27 and 28 of the same lengths as link 25, connect the adjacent large rings of the longitudinal symmetrical chains. These long links are split diagonally along one side to provide openings substantially parallel to the line of tread.

This arrangement provides a unit of tractive surface consisting of a large ring supporting eight radial links which latter bear the wear. The radial links are in turn connected to alternate large and small rings and these surrounding rings are connected by short split links. This serves to make the covering conform to the curved surface of the tire more closely than in the modification previously described and serves to eliminate the use of long links in center of tread. Due to the greater circumference along the line of tread and the lesser circumference on the side walls of the tires the chains C″ and A″ and the outer binding chains above described, will measure different lengths. It is therefore to be understood that the size of the chains may be varied by the substitution at regular intervals of slightly smaller rings. This insures a tight fit of the cover upon the tire.

The mode of insertion and locking of the rings has been illustrated in Figs. 10 and 11. The split links are all constructed with ends which approach very close to the ring as the latter is inserted. Due to the curvature of the ring it is necessary to hold it with is plane at right angles to the axis of the link until the ring has been placed within the latter. The ring may then be brought in plane with the link axis. Fig. 11 shows the ring in such relationship, it being evident that so long as the diameter of the ring coincides with the axis of the link disengagement is impossible as one end of the link is always over the ring member.

An armored flexible covering for pneumatic tires, constructed as above described, will fit the tire tightly as the result of assembly of the various construction units, and will also respond readily to adjustment and save the tire from frictional wear. It is of great benefit in preventing slipping and skidding on slippery roads and serves to assist such tendency in all directions equally well. Its use results in material economy in manufacture and maintenance of the tires.

It will be obvious that in assembly of covering and tire, the former is arranged around the deflated tire. The tire is then inflated. The dimensions of the covering are sufficiently small to establish a tight fit between the covering and tire.

The particular embodiment of my invention shown, is of course, susceptible of considerable variation without departing from the spirit of my invention, and it is to be understood that many changes may be made by those skilled in the art within the scope of the invention as defined in the appended claims.

What I claim is:

1. A flexible armored covering for tires including a plurality of chains symmetrical to the line of tread substantially parallel therewith each chain comprising spaced rings tangential to the tire and alternate connecting links; and links connecting the rings of adjacent chains.

2. A flexible armored covering for tires including a plurality of chains symmetrical to the line of tread substantially parallel therewith each chain comprising spaced rings tangential to the tire and alternate connecting links; and links connecting the rings of adjacent chains in lines inclined to the line of tread.

3. A flexible armored covering for tires including a plurality of chains symmetrical to the line of tread substantially parallel therewith each chain comprising spaced rings tangential to the tire and alternate connecting links; and links connecting the rings of parallel chains in lines inclined to and intercrossing on the line of tread.

4. A flexible armored covering for tires including a plurality of chains symmetrical to the line of tread substantially parallel therewith, each chain comprising spaced rings tangential to the tire, and alternate connecting links; links connecting the rings of parallel chains, the rings of the outer chains having flattened outer sides.

5. A flexible armored covering for tires including a plurality of chains symmetrical to the line of tread, each chain comprising alternate spaced rings tangential to the tire and connecting links; long split links connecting said rings of the inner chains in a diagonal direction, short split links connecting opposite rings of the inner chains, each inner chain being connected to the adjacent outer chain by short links.

6. A flexible armored covering for tires, including relatively long flattened split links intersecting in pairs at right angles and on the line of tread, spaced rings arranged in rows symmetrical to the line of the tread and carrying said links, short links connecting adjacent rings and surrounding each pair of intersecting links, side chains and links connecting the rings therewith.

In testimony whereof I have hereunto set my hand.

JOHN F. OLDFIELD.